June 2, 1964     T. E. G. GARDINER ETAL     3,135,417
PLUGS FOR PIPES AND LOCKING MEANS THEREFOR
Filed May 19, 1960     4 Sheets-Sheet 2

United States Patent Office

3,135,417
Patented June 2, 1964

3,135,417
PLUGS FOR PIPES AND LOCKING
MEANS THEREFOR
Terence Edward Gouvenôt Gardiner, Robert Garbutt, and Phillip William Davis, all of Bristol, England, assignors, by mesne assignments, to Bristol Aerojet Limited, Bristol, England, a company of Great Britain
Filed May 19, 1960, Ser. No. 30,367
14 Claims. (Cl. 220—55.3)

This invention relates to sealing plugs for sealing open ended pipes containing fluid under pressure, and has an important but not exclusive application to sealing the standpipes of nuclear reactors.

According to this invention there is provided a sealing plug for sealing an open end of a pipe for fluid under pressure which pipe is formed internally with an annular sealing seat facing the open end of the pipe, which plug comprises cap and closure parts, whereof the closure part is disposed within the pipe in use of the plug and has a sealing surface to cooperate with the said sealing seat and whereof the cap part is disposed adjacent the end of the pipe in use of the plug and is connected to the closure part through a bellows coupling permitting relative movement of the cap and closure parts lengthwise of the pipe, said cap part carrying abutment means which can be locked in an operative position to prevent the displacement of the plug from the end of the pipe and can be released to permit removal of the plug, and means for actuating locking and release of said abutment means, the cap and closure parts of the plug forming a chamber between them which has a maximum cross-sectional area in a plane transverse to the length of the pipe greater than the area enclosed by the said sealing surface, and a passage in the plug for opening the chamber to the pressure fluid within the pipe.

Two embodiments of the invention will now be described by way of example with reference to the accompanying drawings, in which.

Figure 1:
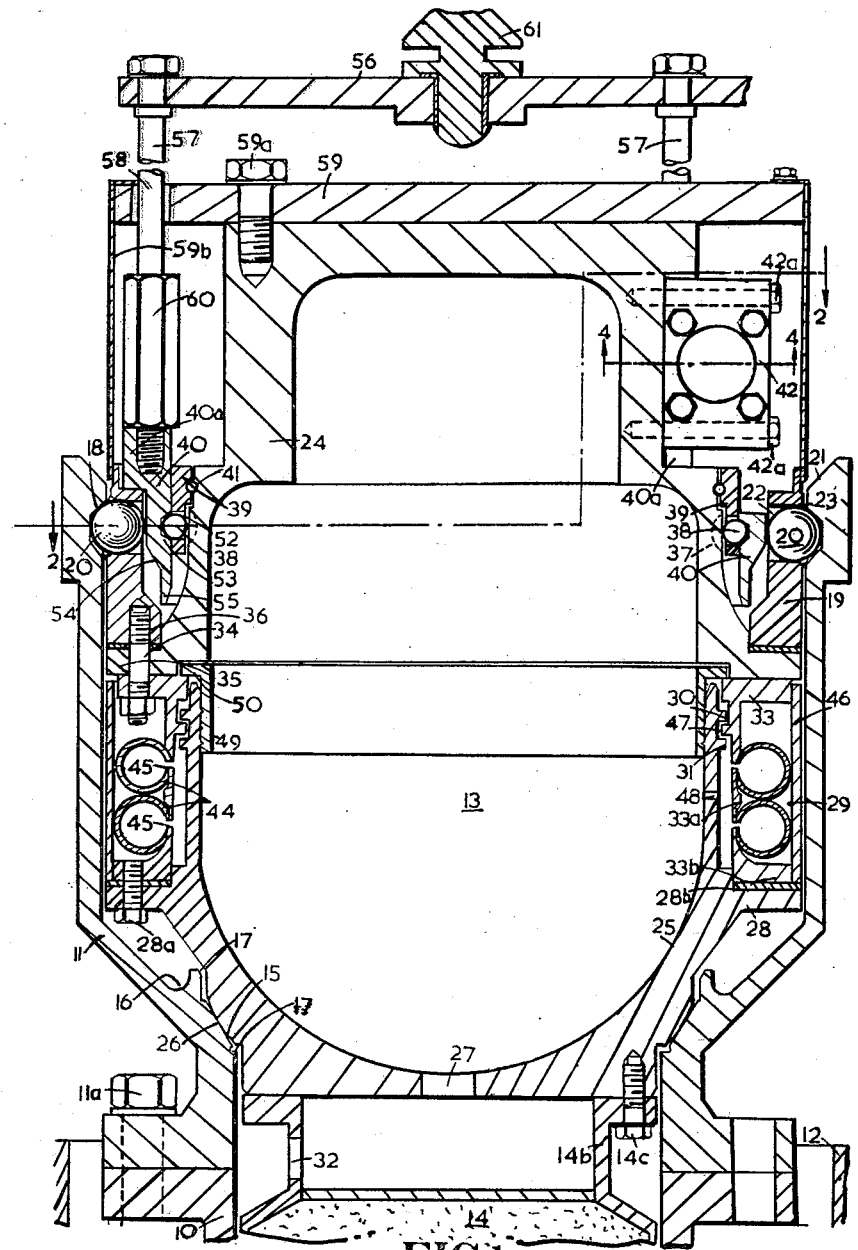
FIGURE 1 is a vertical section of a top portion of a standpipe of a gas cooled nuclear reactor, and shows the top of the standpipe provided with one form of sealing plug in accordance with the invention, the section being taken generally on the line 1—1 of FIGURE 2.
Figure 6:
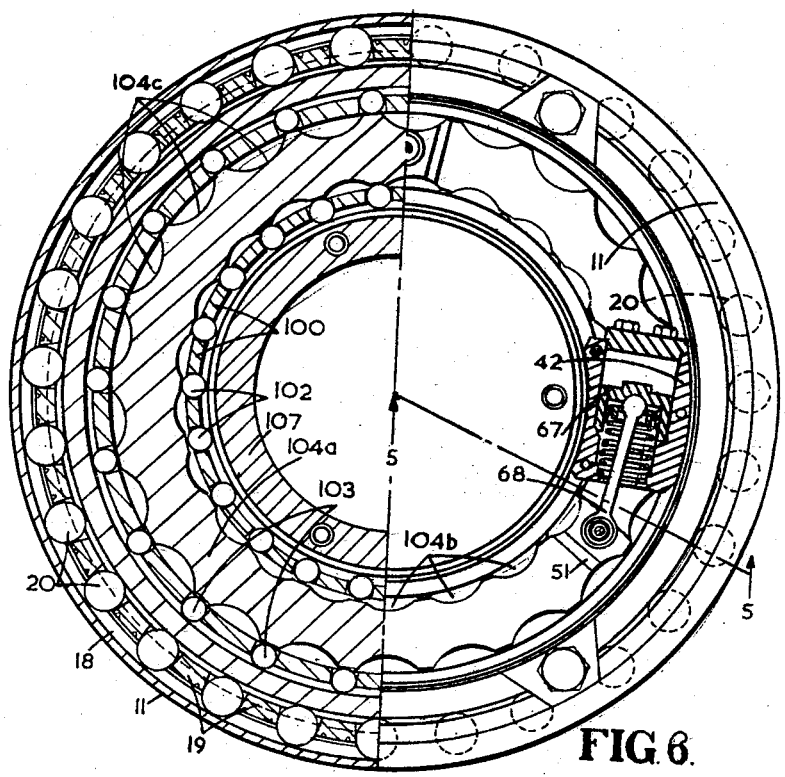
Figure 5:
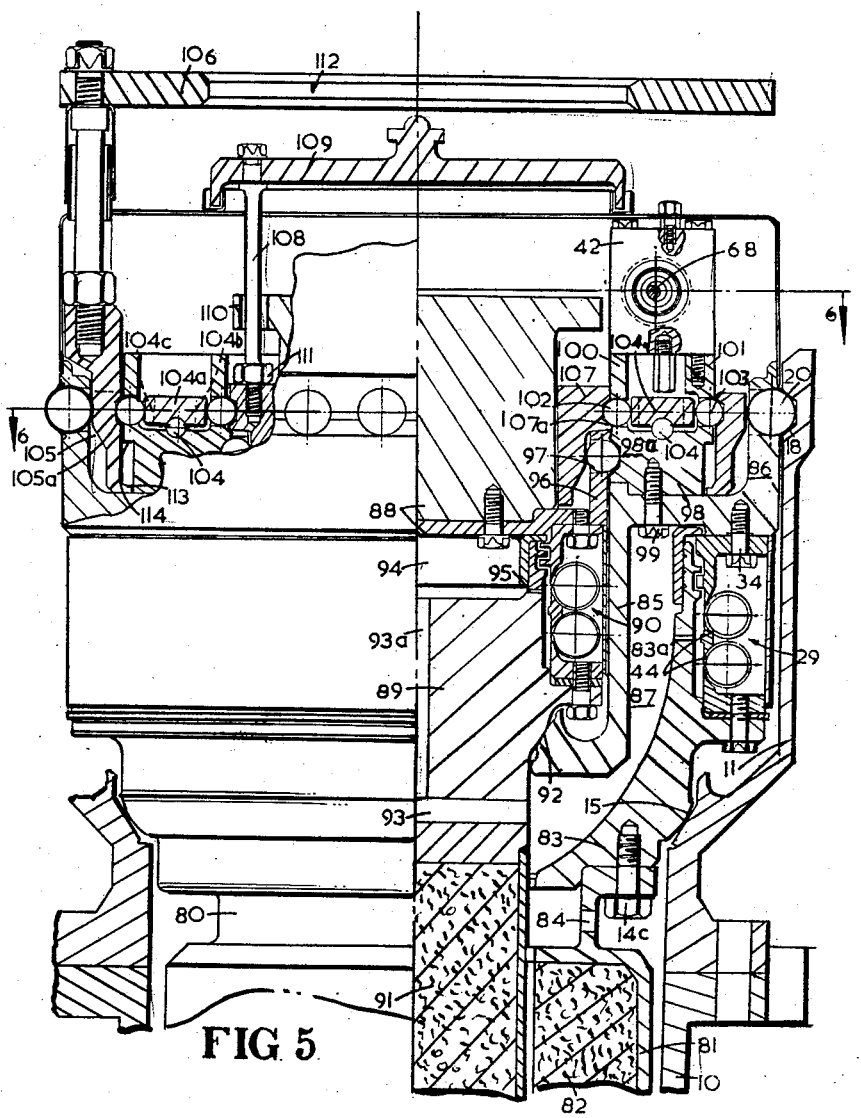

FIGURE 5 is a view which is somewhat similar to FIGURE 1 but shows one of the sealing plugs of the invention employed for sealingly supporting the upper end of a charge chute in the standpipe, and another of the plugs for sealing the top of the charging passage in the charge chute. This figure, from the left-hand side of which the top of the standpipe extension has been omitted, has its right-hand side in section according to the line 5—5 of FIGURE 6; and FIGURE 6 is a section on the line 6—6 of FIGURE 5.

Referring now to the drawings, FIGURE 1 shows the upper end of a vertical standpipe 10 which is provided with a tubular top extension 11. The standpipe, which is one of many, extends downwardly through a biological shield (not shown) below the pile cap 12 to the interior of a pressure vessel which encloses the core of a reactor. The heat from the reactor is removed by coolant gas under considerable pressure which is passed upwardly through the fuel channels in the core and some of the gas thus heated, after reaching the space in the crown of the reactor vessel, enters the open lower ends of the standpipes 10 so that substantially the same gas pressure exists in the standpipes. It is important to ensure that the hot gas, which may be radioactive, does not escape through the upper ends of the standpipes. For this purpose the standpipes are equipped with plug valves or seal plugs 13 from which normally depend solid biological shield plugs 14 of concrete, and an effective gas-tight seal must be provided between each seal plug and the standpipe extension 11 in which it normally seats. The seal plugs 13 and shield plugs 14 must however be readily removable to permit fuel charging and discharging through the standpipes 10 and their top extensions 11.

In addition, the seal plugs must be locked in position against their seats in order to withstand the gas pressure, and the locking and unlocking of the seal plugs together with their insertion and removal must be carried out by remote control. A still further requirement is that the sealing surfaces of the seal plugs and their seats must be able to withstand the heat transmitted by the coolant gas from the reactor vessel.

Figure 3:
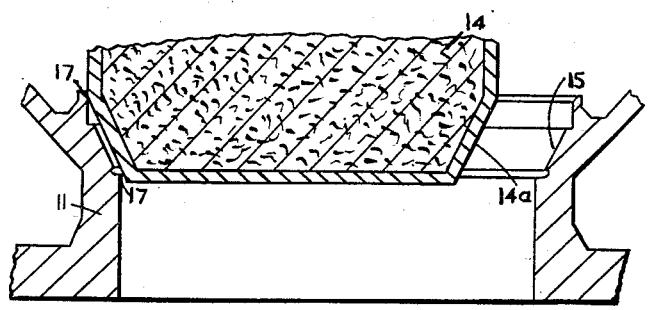
FIGURE 3 shows how a seating in the standpipe is protected from damage when a biological shield fast with the axially-inner part of the plug, and shown in FIGURE 1, is raised and lowered relatively to the standpipe.

Referring in more detail to FIGURES 1 and 3, the steel tubular extension 11 is secured by a ring of bolts 11a to the upper end of the standpipe 10, and protrudes above the pile cap 12 which is supported on the roof of the biological shield. The lower portion of the extension 11 which is frusto-conical provides a conical seat 15 for the seal plug 13 including an annular dirt trap 16 and two annular protecting lips 17 one above and one below the conical seat 15 the exact function of which will be later explained. The upper portion of the extension 11 is formed with an inwards-facing annular groove 18 of substantially wedge section to receive a ring of main locking balls 20 which are held in a carrier 19. The balls 20 which move radially in passages 22 formed in the carrier 19 are retained therein by lips 23 produced by peening the outer surface of the carrier. The upper end of the extension has a bevelled surface 21 the functions of which will be later explained.

The seal plug 13 is also of steel and is divided horizontally to form an upper concave part 24 and a lower concave part 25 which face one another to form a hollow plug. The lower part 25 has a spherical sealing surface 26 which normally seats against the conical seat 15 of the standpipe extension 11, and an aperture 27 which permits passage of gas from the reactor vessel. The lower part 25 also has a radially-outwards extending flange 28 for supporting a bellows unit indicated generally by the reference numeral 29, and an upper and a lower series of circumferentially-spaced shoulders 30, 31 which extend outwardly from the upper portion of this part of the seal plug.

The sheathed concrete shield plug 14 depends from the lower part 25 of the seal plug to which the metal sheath 14b of the shield plug is bolted at 14c and, as shown in FIGURE 3, terminates in a frusto-conical lower end portion 14a. Gas from the reactor vessel is able to pass up between the shield plug and the adjacent standpipe wall to reach a port 32 provided in the sheathing of the shield plug, whence it may pass inwardly to reach the aperture 27 and so enter the hollow seal plug.

It is important to prevent damage to the conical seat 15, and during insertion or removal of the two plugs 13, 14 by means of a lifting cable there is a danger that the plugs may swing and collide with the conical seat. Accordingly, the shape of the frusto-conical end portion 14a of the shield plug, and the location and spacing of the two lips 17 on the standpipe extention 11 are so designed that no surface of either plug can contact the conical seat save the spherical surface 26 of the seal plug 13 which is designed to seat thereon. FIGURE 3 illustrates how the conical seat is shielded from contact by a swinging lower end portion 14a of the heavy shield plug 14.

The upper part 24 of the seal plug is flanged at its lower end at 35 and bolted between the main ball carrier 19 and a housing 33 for the bellows unit 29, plain portions of the shanks of the bolts 34 passing freely through the flange 35, and an adjusting washer 36 being provided between the carrier 19 and the seal plug flange 35. Level with the ring of main locking balls 20, the upper part 24 of the seal plug provides an annular series of outwardly facing shallow pockets 37 each of which is adapted to receive part of one of an annular series of inner locking balls 38 which normally serve to lock a rotatable locking ring 39 to an operating sleeve 40. Above these pockets 37 a ball bearing 41 permits the locking ring 39 to be rotated relatively to the upper part 24 of the seal plug under the control of three piston-and-cylinder units, the cylinders 42 for which are bolted to the upper part of the seal plug. Three radial passages 43 in the seal plug wall (see FIGURE 2) communicate the interior of the seal plug with the interiors of the cylinders 42.

The bellows unit 29 comprises two distensible members in the form of Omega-type annular bellows 44 which are mounted in series one above the other within the annular housing 33. Each bellows is formed from a hollow ring having an inwardly facing slit or mouth 45, and the housing is made up of three vertically spaced annular members 33, 33a and 33b which are connected together by welding them to the lips of the mouths 45 of the bellows 44. The member 33b is bolted at 28a at its lower end to the supporting flange 28 of the seal plug lower part 25 with an intervening sealing washer 28b, and the member 33 is held to the main ball carrier 19 by the bolts 34 which connect the latter to the seal plug upper part 24. The outer side of the bellows unit is protected by an external sleeve 46. Three circumferentially spaced shoulders 47 extend radially inwards from the housing member 33 to lie, with a predetermined clearance, between the upper and lower series of shoulders 30, 31 of the lower part 25 of the seal plug. The three series of shoulders 30, 31, 47 form a loose bayonet-type fitting, with the seal plug shoulders 30, 31 constituting upper and lower stops for limiting relative axial movement of the seal plug parts 24 and 25, and also protecting the bellows 44 from excessive loading.

A single passage 48 of small diameter drilled in the wall of the seal plug part 25 allows gas from the interior of the hollow seal plug to pass to the mouths 45 of the bellows 44.

To restrict the escape of gas between the slightly radially spaced surfaces of the upper member 33 of the bellows housing and the seal plug part 25 in the event of a bellows fracture, an inner sleeve is provided. This inner sleeve has a skirt part 49, which is well sealed to the inner surface of the seal plug part 25, and a flange part 50 which seats on the top of the bellows housing member 33. If the bellows 44 should fracture, the resulting differential pressure will load the flange part 50 of the inner sleeve against the bellows housing and restrict the escape of gas from between them.

The two parts of the seal plug are thus sealingly interconnected by the bellows unit 29 which, because of the location of its bellows 44 adjacent the wall of the enlarged section of the standpipe extension 11, permits the standpipe gas pressure to act against the parts 24, 25 of the seal plug through points or lines of application which are radially spaced further from the longitudinal or vertical axis of the seal plug 13 and extension 11 than the annular line of contact between the spherical and conical sealing surfaces of the seal plug and extension respectively. In other words the seal plug is a differential area plug and the net result is a downwards loading by the gas pressure of the seal plug lower part 25 against the seat 15 of the extension 11, and an upwards loading of the main locking balls 20 against the reaction surface of the groove 18 in the extension 11.

The rotatable locking ring 39 is provided in three circumferentially-spaced positions with axial extensions 51, and also with a series of circumferentially-spaced radial passages 52 which contain the inner locking balls 38 and permit them to move outwardly or inwardly to engage either in an annular groove 53 in the sleeve 40 or in the pockets 37 in the seal plug upper part 24. The annular groove 53 has its lateral walls diverging to its mouth as shown in FIGURE 1.

The operating sleeve 40, which is axially movable in relation to the seal plug, is shown in FIGURE 1 as being in its lower, and normal, position in which it retains the main locking balls 20 in their radially outer position in which they engage in the groove 18 for axially locking the carrier 19, and thus the upper part 24 of the seal plug, to the standpipe extension 11. The sleeve 40 has a tapered part 54, and a cylindrical bottom part 55 so arranged that when during raising of the sleeve its terminal part 55 comes opposite the annular groove 18 in the standpipe extension, the main locking balls 20 are no longer constrained to remain in the groove but are free to move inwardly out of engagement with the extension.

The sleeve 40, however, is locked to the locking ring 39 by the inner ring of locking balls 38 and therefore cannot be accidentally moved to free the main locking balls 20 until it has been released from the locking ring 39. This release is made possible by part-rotational movement of the locking ring 39 under the control of the aforesaid piston units to bring each of the inner balls 38 opposite one of the pockets 37 formed in the seal plug upper part 24. If now the sleeve 40 is raised the lower wall of the groove 53 will push the inner balls 38 inwardly into their respective pockets 37 so as to release itself.

The sleeve 40 is raised and lowered by lifting mechanism housed in a charge machine (not shown), and is attached to the lifting mechanism by means of a spider. The latter comprises a lifting plate 56 from which depend three bolts 57 which pass freely through apertures 58 in a mounting plate 59 bolted at 59a to the top of the seal plug part 24, the lower ends of the bolts 57 engaging in upward extensions 40a of the sleeve 40. The bolts carry abutments 60 for engaging the underside of the mounting plate 59 during lifting or lowering of the seal plug, and the lifting plate 56 is equipped with a grab attachment 61 for engagement by a lifting grab and cable of the aforesaid lifting mechanism. The peripheries of the carrier 19 and mounting plate 59 are sealingly interconnected by a casing 59b.

Figure 2:
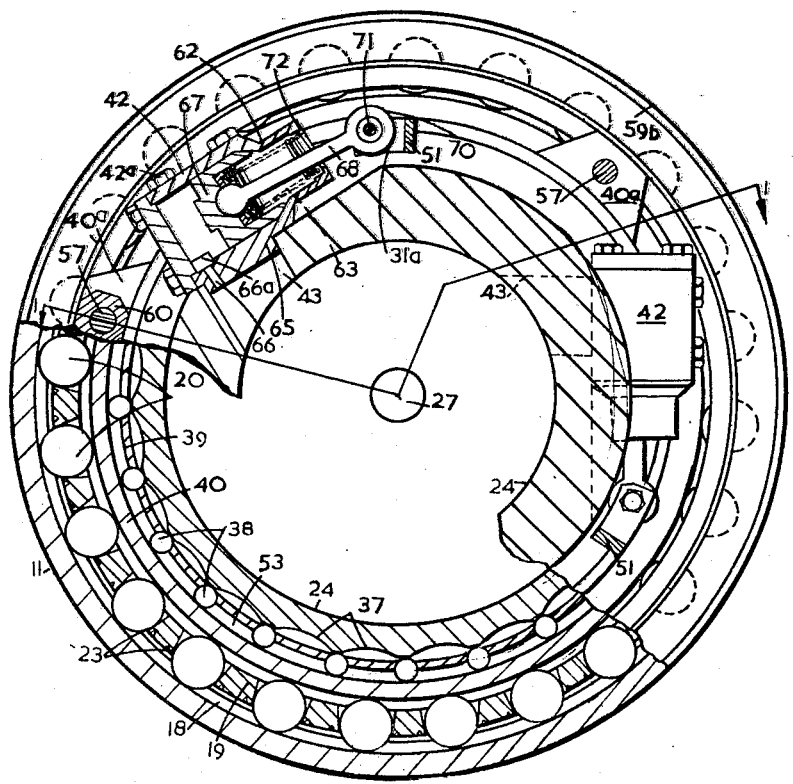
FIGURE 2 is a section taken mainly on the line 2—2 of FIGURE 1.
Figure 4:
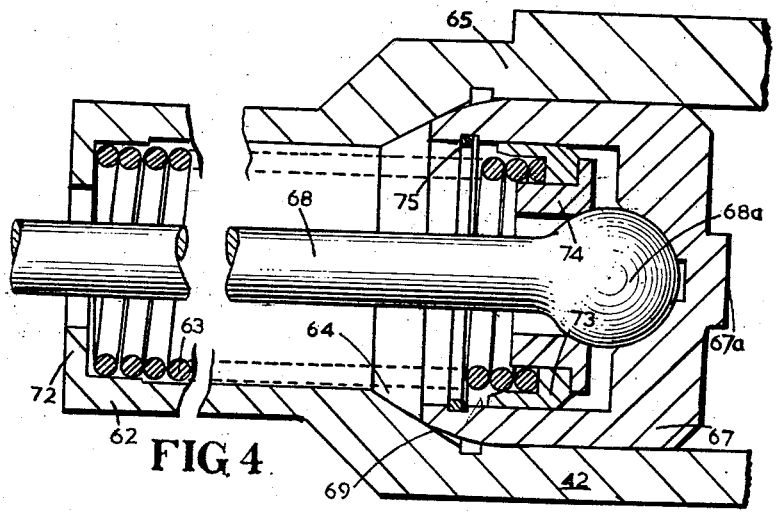
FIGURE 4 is a longitudinal section, with a central portion omitted of a piston and cylinder arrangement for moving a rotary locking ring to and from its operative position, the section being taken on the line 4—4 of FIGURE 1.

The three piston-and-cylinder units extend into the spaces between the pillars 51 of the locking ring 39. Referring to FIGURES 2 and 4, each of these units comprises a cylinder 42 bolted at 42a to the seal plug upper part 24 and provided at its open end with a tubular extension 62 of reduced diameter which houses a coiled compression spring 63. The middle portion of the inner surface of each cylinder is constituted by a converging or frusto-conical surface 64 and each cylinder is located in position by means of a lateral spigot projection 65 which enters one of the radial passages 43 formed in the wall of the seal plug upper part 24. The spigot projection 65 is provided with a passage 66 which establishes a communication between the interior of the cylinder and the radial passage 43, the inner surface of the cylinder in the region of the adjacent end of the communicating passage 66 being recessed at 66a so that gas from the interior of the seal plug can always enter the cylinder 42 whatever the position of the piston 67, which latter has an end stop 67a for ensuring that there will be a working space communicating with the recess 66a when the piston is at the inner limit of its travel. The piston is shaped to receive a spherical end 68a of a connecting rod 68 to form a ball joint therewith, and has a wall portion provided with a spherical seating surface 69 which is adapted to seat against the frusto-conical surface 64 of the cylinder and limit the outward movement of the piston 67. The connecting rod 68 extends substantially tangentially of the rotatable locking ring, and at its other end terminates in an eye 70 which enters a horizontal slot 51a formed in one of the locking ring pillars 51, the eye being secured to the pillar by a bolt 71 which extends across the slot. One end of the coil spring 63, which surrounds the connecting rod 68, abuts an apertured end flange 72 on the tubular extension 62, and the other end abuts a flanged retaining sleeve 73 which engages a split collet 74 mounted on the spherical end of the connecting rod. The retaining sleeve 73, which is slidable on the inner surface of the piston wall, is free to move with the connecting rod 68 away from the piston 67 for a short distance which is determined by an annular stop 75 mounted in an annular groove in the interior of the piston wall. The coil spring 63 biases the connecting rod 68 and the piston 67 into the cylinder 42 against the normal standpipe gas pressure in the cylinder head which may, for example, be 200 p.s.i.

The unsealing and removal of the seal plug 13 is accomplished in the following manner.

A machine (not shown) is moved across the pile cap 12 into position above the standpipe extension 11 and a sleeve of the machine is lowered to engage the bevelled surface 21 whereby to effect a seal between the machine and the standpipe extension. The gas pressure in the machine is then raised to be equal to that of the gas in the standpipe and seal plug, the gas from the machine passing downwardly along the inner face of the standpipe extension 11 and inwardly through the main ball passages 22 in the carrier 19 to enter the cylinders 42 through their apertured end flanges 72. As the pressure of the machine gas rises, the combined downwards pressure exerted by the machine gas and the weight of the upper part 24 of the seal plug overcomes the standpipe pressure and the upper part 24 moves downwardly, compressing the bellows 44 and causing the shoulders 47 to abut the lower shoulders 31 on the seal plug lower part 25. This downwards movement of the part 24 unloads the main balls 20 from the upper surface of the annular groove 18. When the rising gas pressure reaches a predetermined figure, the pistons 67 are caused to withdraw into their cylinders 42; and their spring-urged connecting rods 68 move with them. This movement of the connecting rods causes the locking ring 39 to rotate partly and bring the inner balls 38 opposite their respective pockets 37 in the seal plug upper part 24.

The lifting mechanism in the machine is then operated to raise the spider 56 and operating sleeve 40. The initial upwards movement of the sleeve causes the lower wall of its groove 53 to push the inner balls 38 inwardly into their pockets 37, and the continued rise of the sleeve brings its cylindrical bottom part 55 opposite the ring of main locking balls 20 so that they are no longer maintained by the sleeve in their outer, or plug-locking position. By this time the raising of the spider has brought the abutments 60 on the lifting bolts 57 into engagement with the underside of the mounting plate 59 so that further raising by the lifting mechanism will act directly on the seal plug assembly; but as the initial raising movement imparted to the carrier 19 causes the freed and unloaded main balls 20 to be moved, by the divergent upper wall of the groove 18, inwardly out of engagement with the standpipe extension 11 the seal plug part 24 is thus unlocked from the extension. The seal plug assembly, including the shield plug 14, can now be hoisted out of the standpipe extension and into the machine, leaving an uninterrupted passage through the standpipe and its extension. The bellows unit 29 which interconnects the upper and lower parts 24, 25 of the seal plug is extended by the lifting of the upper part of the seal plug, but the consequential engagement of the housing shoulders 47 with the upper series of seal plug shoulders 30 transmits the lift to the lower part of the seal plug and prevents overstrain of the bellows 44.

The replacement of the plugs 13, 14 may be achieved in the following fashion.

The seal plug together with its attached members is lowered into the standpipe extension 11 by the lifting mechanism of the machine until the spherical surface 26 of the lower part of the seal plug comes to rest on its conical seat 15, with the shield plug 14 extending downwardly into the standpipe 10. Continued lowering of the spider causes the seal plug upper part 24 to abut the now stationary lower part 25 by compressing the bellows 44, with the shoulders 47 abutting the seal plug lower shoulders 31. Consequently the carrier 19 occupies a position slightly below that shown in FIGURE 1 to permit the main balls 20 freely to enter the annular groove 18 in the standpipe extension. The continued lowering of the spider also causes its lifting bolts 57 to pass through the apertures 58 in the mounting plate 59, and the tapered part 54 of the descending operating sleeve 40 to urge the main balls 20 outwardly into the annular groove 18 of the standpipe extension 11. Thereafter the main balls are retained in their outer, plug-locking position by the cylindrical upper part of the sleeve as shown in FIGURE 1.

The gas pressure inside the machine is then reduced, and this consequently reduces the gas pressure above the seal plug and around the exterior of the wall of its upper part 24. When the machine gas pressure has been reduced by a small predetermined amount, the standpipe pressure is able to overcome the combined pressure of the springs 63 and the reducing machine pressure, and urge the pistons 67 to move outwardly. The resulting combined movements of the connecting rods 68 cause the locking ring 39 to rotate partly and thereby push the inner balls 38 out of their shallow pockets 37 and into engagement with the annular groove 53 in the sleeve 40, thus locking the sleeve in its ball-retaining position and ensuring that the seal plug remains locked to the standpipe extension.

As the machine gas pressure is further reduced, the standpipe gas pressure is enabled to act through the bellows 44 firstly to raise the upper part 24, and thereby urge the main locking balls 20 against the upper reaction surface of the groove 18, and secondly to enable the pressure in the internal chamber of the plug to urge the surface 26 of the lower part 25 against its seat 15. The machine gas pressure is then reduced to that of the atmosphere, resulting in a correspondingly increased loading of the lower part 25 to effect a good seal between sealing surfaces 15 and 26. The machine sleeve is then disengaged from the extension 11 and the machine may be removed.

The bevelled surface 21 not only assists the sealing of the machine to the standpipe extension 11, but it also provides a guide for the insertion of the plugs 13, 14.

It may happen that one of the pistons 67 may reach the limit of its outward stroke slightly before the other pistons. In such a case, as the other pistons complete their strokes the connecting rod of the piston in question is pulled off its seat on the piston, the retaining sleeve 73 and centering collar 74 moving with the connecting rod. This unseating or lost motion is limited by the stop 75 on the piston wall. The use of spherical and conical contacting surfaces 69, 64 on the piston wall and cylinder wall respectively reduces the possibility of sticking.

During insertion and removal of the plugs, the two annular lips 17 adjacent the conical seating 15 protect it from contact by the ends of the plugs 13, 14. The spherical sealing surface 26 of the seal plug is coaxial with the part 25 of the seal plug, and by providing slight radial clearance between the outer surface of the part 25 and the adjacent inner surface of the upper portion of the bellows housing 33, the surface 26 is enabled to be self-centering on the seat 15.

During servicing of the reactor it is necessary from time to time to remove irradiated fuel elements from a region below the bottoms of the standpipes, and for this purpose it is necessary, after the seal plug previously described has been removed, for the machine to which reference has already been made, to insert in the standpipe a hollow charge chute up which the irradiated fuel elements can subsequently be drawn, and down which fresh fuel elements can be lowered. The raising and lowering of the fuel elements is effected by a second machine (not shown) which is adapted to make a seal with the top of the standpipe, while the pressures within the machine and standpipe are appropriately balanced in a manner similar to that already described.

When the charge chute is in position in the standpipe it is necessary for it to be sealed thereto, and it is also necessary that the charge chute be provided with a removable seal plug for the opening at the top of its hollow interior so that the said second machine can deal with the fuel elements.

Such an arrangement is shown in FIGURES 5 and 6 in which certain parts previously described have been given the same reference characters for ease of understanding.

FIGURE 5 shows the top 80 of the metal casing 81 of a biological shield 82 forming part of the charge chute being fast with a lower seal plug portion 83 which effects a seal with the seat 15 of the standpipe extension 11. The upper part of this seal plug is indicated at 85, having an integral upstanding flange 86 (which is the equivalent of the carrier 19 of FIGURE 1) carrying the main locking balls 20 for coaction with the groove 18 of the standpipe extension. The seal plug parts 83 and 85 define a chamber 87 between them which is in communication with the pressure within the standpipe through a port 84 which is the equivalent of the port 32; and the two parts of the seal plug are interconnected by a bellows unit 29, as in FIGURE 1, to which pressure is fed through a duct 83a from the chamber 87.

Coaxially within this seal plug is an inner seal plug for the bore of the charge chute, this inner seal plug having upper and lower parts 88, 89, respectively, which are interconnected by a second bellows unit which is indicated at 90 and is similar in all respects to the unit 29. The lower part 89 of the inner seal plug carries a biological shield plug 91 and has its seating (which is similar to the seating 15, 26 of FIGURE 1) at 92 at the bottom of the inner periphery of the upper part 85 of the outer seal plug. Ducts 93 and 93a in the lower part 89 of the inner seal plug establish a communication between the chamber 87 and a second chamber 94 comprised between the inner seal plug parts 88 and 89 and serving to feed the pressure through duct 95 to the bellows unit 90.

The upper part 88 of the inner seal plug has an upstanding flange 96 with through-passages containing main locking balls 97 which have the same function as the balls 20 but are for locking the said upper part 88 to a ring-like member 98 secured by bolts 99 to an annular web uniting the upper part 85 of the outer seal plug to the upstanding flange 86.

The ring-like member 98 is formed with upstanding flanges 100 and 101 at its inner and outer peripheries, and these flanges have respective through-passages for sets of locking balls 102 and 103 which are the equivalent of the locking balls 38 of FIGURE 1. Between the flanges 100 and 101 the member 98 is provided with a coaxial track for ball bearings 104 from which a rotatable locking ring 104a (similar to locking ring 39 of FIGURE 1) is supported, and this locking ring is provided with recesses 104b and 104c in its inner and outer peripheries for coaction with the two sets of balls 102 and 103. The ring 104 is rotated by the connecting rods 68 of the three piston-and-cylinder units as in the previously-described construction for bringing its recesses into and out of conjunction with the balls 102 and 103.

The main locking balls 20 are held in the groove 18 of the standpipe by a sleeve 105 which is similar to the sleeve 40 and is connected in the same way to a lifting plate 106 like 56. In a rather similar way the main locking balls 97 of the inner seal plug are held engaged in a coacting groove 98a of the ring-like member 98 by a sleeve 107 which is connected by long screws 108 to a lifting plate 109. The screws 108 pass with clearance through holes in lugs 110 fast with the upper part 88 of the inner seal plug.

It will be seen that by rotating the locking ring 104a to bring its recesses opposite the balls 102 the latter can move out of an annular groove 107a of the sleeve 107 so as to enable the latter to be lifted with the lifting plate 109 and thus allow the main locking balls 97 to move radially inwardly out of the coacting groove 98a of the ring-like member 98. This enables the abutments 111 on screws 108, acting on lugs 110, to lift the inner seal plug bodily out of the top of the charge chute. In the meantime, no lifting effort having been applied to lifting plate 106 (which has a central hole 112 through which the inner seal plug can be lifted) the sleeve 105 retains the main locking balls 20 in their locking position.

When the purpose for which the removal of the inner seal plug has been served, and the plug has been replaced and locked in position, an appropriate turning of the ring 104a will allow the balls 103 to enter the peripheral recesses 104c whereby to disengage an annular groove 105a of the sleeve 105 and permit the latter to be raised by a lifting of the lifting plate 106. This will permit the main locking balls 20 to move out of engagement with the groove 18, whereafter an inturned lip 113 of the sleeve will engage an annular shoulder 114 of the ring 98 and so cause the charge chute, with both seal plugs to be lifted out of the standpipe. When that has been done a plug like 24, 25 of FIGURE 1 is inserted into the top of the standpipe and locked in position to seal it.

What we claim as our invention and desire to secure by Letters Patent of the United States is:

1. A sealing plug for sealing an open end of a pipe for fluid under pressure which pipe is formed internally with an annular sealing seat facing the open end of the pipe, which plug comprises cap and closure parts, whereof the closure part is disposed within the pipe in use of the plug and has a sealing surface to cooperate with the said sealing seat and whereof the cap part is disposed adjacent the end of the pipe in use of the plug and is connected to the closure part through a bellows coupling permitting relative movement of the cap and closure parts lengthwise of the pipe, said cap part carrying abutment means which can be locked in an operative position to prevent the displacement of the plug from the end of the pipe and can be released to permit removal of the plug, and means for actuating locking and release of said abutment means, the cap and closure parts of the plug forming a chamber between them which has a maximum cross-sectional area in a plane transverse to the length of the pipe greater than the area enclosed by the said sealing surface, and a passage in the plug for openings the chamber to the pressure fluid within the pipe.

2. A sealing plug as claimed in claim 1 comprising also motor means mounted on the cap part and connected to said means for actuating locking and release of the abutment means.

3. A sealing plug as claimed in claim 2 in which the motor means comprises a hydraulic motor which is operable in a direction to urge the abutment means into said operative position by the pressure of the fluid in the pipe.

4. A sealing plug as claimed in claim 3, in which the motor means is operable by the ambient pressure outside the cap part to move the abutment means out of its operative position.

5. A sealing plug according to claim 1, in which the cap and closure parts comprise respective concave members having their concavities facing each other to form the chamber, the said passage comprising an aperture formed in the closure part and permitting fluid from the pipe to enter the chamber.

6. A sealing plug according to claim 1, in which the bellows coupling surrounds the closure part and communicates with the chamber through a passage in the wall of the closure part.

7. A sealing plug according to claim 1, in which the cap part of the plug has fast therewith a coaxial annular wall provided with radially-directed through-passages which house the said abutment means and which are shorter than the respective abutment means contained within them, and in which the means for actuating locking and release of the abutment means comprise an operating sleeve which is arranged coaxially within the said wall to be movable axially relatively thereto between an operative position in which the operating sleeve causes the abutment means to extend beyond the radially-outer ends of the through-passages for engaging an abutment on the pipe and a releasing position in which it allows the said extending ends of the abutment means to be retracted from their operative position into the through-passages for disengaging the abutment means from said abutment on the pipe to release the plug for axial removal from the pipe.

8. A sealing plug according to claim 7, in which the operating sleeve comprises an axially-extending portion having a cylindrical surface serving to hold the abutment means in engagement with the abutment on the pipe, and a second axially-extending portion of less diameter which permits the abutment means to move into their unlocking positions, the two axially-extending portions being joined by an inclined step for moving the abutment means into said operative position when the operating sleeve is moved in the appropriate axial direction relative to the cap part of the plug.

9. A sealing plug according to claim 7, comprising also a rotatable locking ring which holds the operating sleeve against axial movement, said locking ring having radially-directed through-passages containing respective engagement means, which passages are shorter than the engagement means contained within them, an adjacent annulus of the cap portion of the plug having circumferentially-spaced depressions capable of receiving the engagement means, when the rotatable locking ring is appropriately turned, disengage the engagement means from the operating sleeve.

10. A sealing plug according to claim 9 in which the operating sleeve has a coaxial annular groove constituting a second abutment means, and in which the engagement means are balls, the groove forming the second abutment means having an inclined lateral wall which, when the rotatable locking ring has been turned into its unlocking position and the axially movable operating sleeve is raised, cause the balls constituting the engagement means to be moved into the depressions for unlocking the axially movable operating sleeve.

11. A sealing plug according to claim 9 comprising motor means mounted on the cap part and connected to the rotatable locking ring to move it between its locking and unlocking positions.

12. The combination with a standpipe of a nuclear reactor of a sealing plug according to claim 8 in which the abutment on the pipe is formed by a groove extending internally round the end portion of the pipe wall, and in which the abutment means are balls, the groove having an inclined lateral wall, which, when the operating sleeve is moved axially to its unlocking position, causes the balls to be moved into their unlocking positions on application of a lifting movement to the plug.

13. The combination with a standpipe of a nuclear reactor of a sealing plug as claimed in claim 1, which standpipe affords said annular sealing seat facing an open end of the pipe.

14. The combination with a tubular body of a plug according to claim 1 sealing one end of the tubular body, a pipe encircling the tubular body and arranged coaxially therewith, and a second plug according to claim 1 sealing the space between the tubular body and the pipe.

References Cited in the file of this patent
UNITED STATES PATENTS

| | | |
|---|---|---|
| 1,858,013 | Heins | May 10, 1932 |
| 1,867,559 | Beck | July 10, 1932 |
| 2,765,181 | Butterfield | Oct. 2, 1956 |
| 2,793,058 | Jacobson | May 21, 1957 |
| 2,926,934 | Gill | Mar. 1, 1960 |
| 2,967,640 | Robert | Jan. 10, 1961 |